UNITED STATES PATENT OFFICE.

RICHARD R. COBB, OF TEXARKANA, ARKANSAS.

PROCESS OF PRESERVING MEATS.

1,054,905.  Specification of Letters Patent.  Patented Mar. 4, 1913.

No Drawing.  Application filed September 20, 1912.  Serial No. 721,500.

*To all whom it may concern:*

Be it known that I, RICHARD R. COBB, a citizen of the United States, residing at Texarkana, in the county of Miller and State of Arkansas, have invented certain new and useful Improvements in Processes of Preserving Meats, of which the following is a specification.

This invention relates to improvements in processes for preserving meats, and more particularly for keeping meat in a palatable, fresh, and healthful condition without the use of ice, for an indefinite period.

The object of my process is to provide a sure method of dressing and packing meats which hitherto have with great difficulty, if at all, been saved during hot weather, without the use of ice as a cooling agent.

In carrying out my invention successfully it is necessary to proceed in a manner which will assure that the meats will not undergo deterioration or putrefaction, and as much attention is required in preparing a solution which will retard the access of impurities into the meat, as in dressing or preparing the meat itself so as to become permeated with this solution. An additional essential factor in properly applying my process lies in carrying out the particular method of packing the treated meats. It is by the application of all of these features of preservation that the preserved meat will be able to withstand the reactions to which meats are subject during hot weather.

My process consists of the following steps, to be taken up in the order stated:—The first step is to prepare the liquid or solution in which the meats are to be immersed. Fill a suitable vessel two thirds full of water, or with enough water to submerge the meats in. Then saturate the water with common salt and heat it to a temperature of 190 to 200° Far. This temperature of the liquid should be maintained until the meats are ready to be submerged. Then add the following ingredients to the solution, 100 pounds of meat being taken as a unit of mixture: salt, 8 pounds; sugar, 4 pounds; saltpeter ¼ of one pound; pulverized black pepper, ¼ of one pound; borax, ¼ of one pound. It is optional to add spices and flavoring to this solution. All the ingredients, except the salt may be varied. The second step has reference to the meats to be preserved. Take meat, such as pork, either fresh killed or that has been salted down for any length of time, provided that it has not soured or spoiled. It is very essential to cut this meat into strips about 3 inches thick, cutting into both meat and bone as a butcher would cut it. The bones should not be removed. The object of cutting the meat into strips is to facilitate the salting, which is especially desirable for salt ham, shoulder, and the sides of pork. The third step is to impregnate the strips of meat with this solution, which has been kept skimmed, clean, and at the temperature stated, in the meanwhile. The strips of meat will then be placed in the vessel containing the solution and after it has remained in it for twenty-five minutes at above temperature, then increase the temperature to the boiling point and keep up this temperature for ten minutes or until the brine has thoroughly penetrated the meat. While the heat is at the first-stated temperature, the blood and impurities will be driven out of the meat, and while the solution is boiling the salt, etc., will be driven into the meat. The boiling of the solution is, thus, to be distinguished from cooking the meat, because at this stage, the meat will not be cooked, but simply salted, and prified, and placed in a condition to be packed and to retain its freshness and palatableness while packed.

The fourth and last step is to insure that climatic influences shall not interfere with the keeping qualities of the meat treated in the manner stated. It is essential that a vessel such as a stone jar be taken, and the strips of meat be placed therein, and suitably packed down by weights, the weights resting on some intervening part. It is then essential before the vessel is stored, and while the meat is under compression in the vessel, to pour the skimmed solution while in the same state as when the meats were first treated, upon the meat, so that the interstices of the meat in the vessel shall be filled with the solution, and the top of the meat covered thereby. The object of pouring the hot liquid on the meat, during this stage, is to insure that the meat remain salted while it is stored away. This last step can also be carried out by filling the vessel with the solution and then weighting the meat down in said solution.

The above process has been tested in use and has been successfully tried in the Torrid Zone where the preservation of meat, during the hot season, becomes a necessity which is felt on a large scale by housekeepers as well as butchers, the problem being not to dress the meat for immediate cooking, or to salt it for a casual need, but to prepare it in such a way that it will not lose its freshness, flavor, or palatable qualities, and so that it will keep indefinitely. The steps of the process hereinbefore described lead to the preservation of meat for this exacting purpose, if pursued in the order set forth.

What I claim is:—

1. The process for preserving meats which consists in first preparing a hot briny solution, then cutting the meat in thin strips, thereafter immersing the strips of meat in said hot solution to rid them of impurities, thereafter raising the temperature of said solution to cause the brine to permeate the meat, then keeping the treated meat compresesd in a vessel, and thereafter filling the interstices between the meat and the walls of said vessel with said hot briny solution.

2. The process of preserving meat which consists in first preparing a hot solution from a mixture of salt, water, sugar, saltpeter, pulverized black pepper, and borax, then cutting meat into thin strips, thereafter skimming the hot solution and pouring it over the thin strips of meat, then boiling said solution while the meat is in it, thereafter placing the treated meat in a vessel, then weighting down said meat in said vessel, then filling the vessel with said hot solution.

3. The process of preserving meat which consists in first preparing a briny solution maintained at a temperature below the boiling point, then cutting the meat into thin strips, thereafter immersing said strips of meat in said heated solution to rid them of impurities, thereafter raising the temperature of said solution to the boiling point to cause the brine to permeate the meat, then placing said strips in a vessel for storage, then covering the strips with said solution while hot.

4. The process of preserving meat which consists in first preparing a solution from a mixture of salt, water, sugar, saltpeter, pulverized black pepper, and borax, then heating said solution in a vessel at a temperature below the boiling point, thereafter cutting the meat into thin strips and placing said strips in said vessel, then raising the temperature of said solution to the boiling point, thereafter weighting down said strips of meat in a storage vessel, and then pouring the same solution over the meat while its temperature is below the boiling point.

In testimony whereof I affix my signature in presence of two witnesses.

RICHARD R. COBB.

Witnesses:
CARROLL HESS,
J. B. COBB.

---

Copies of this patent may be obtained for five cents each, by addressing the "Commissioner of Patents, Washington, D. C."